July 21, 1936.   H. H. HARRIS   2,048,264
AUTOMOBILE LIFTING JACK
Filed July 13, 1935   2 Sheets-Sheet 1
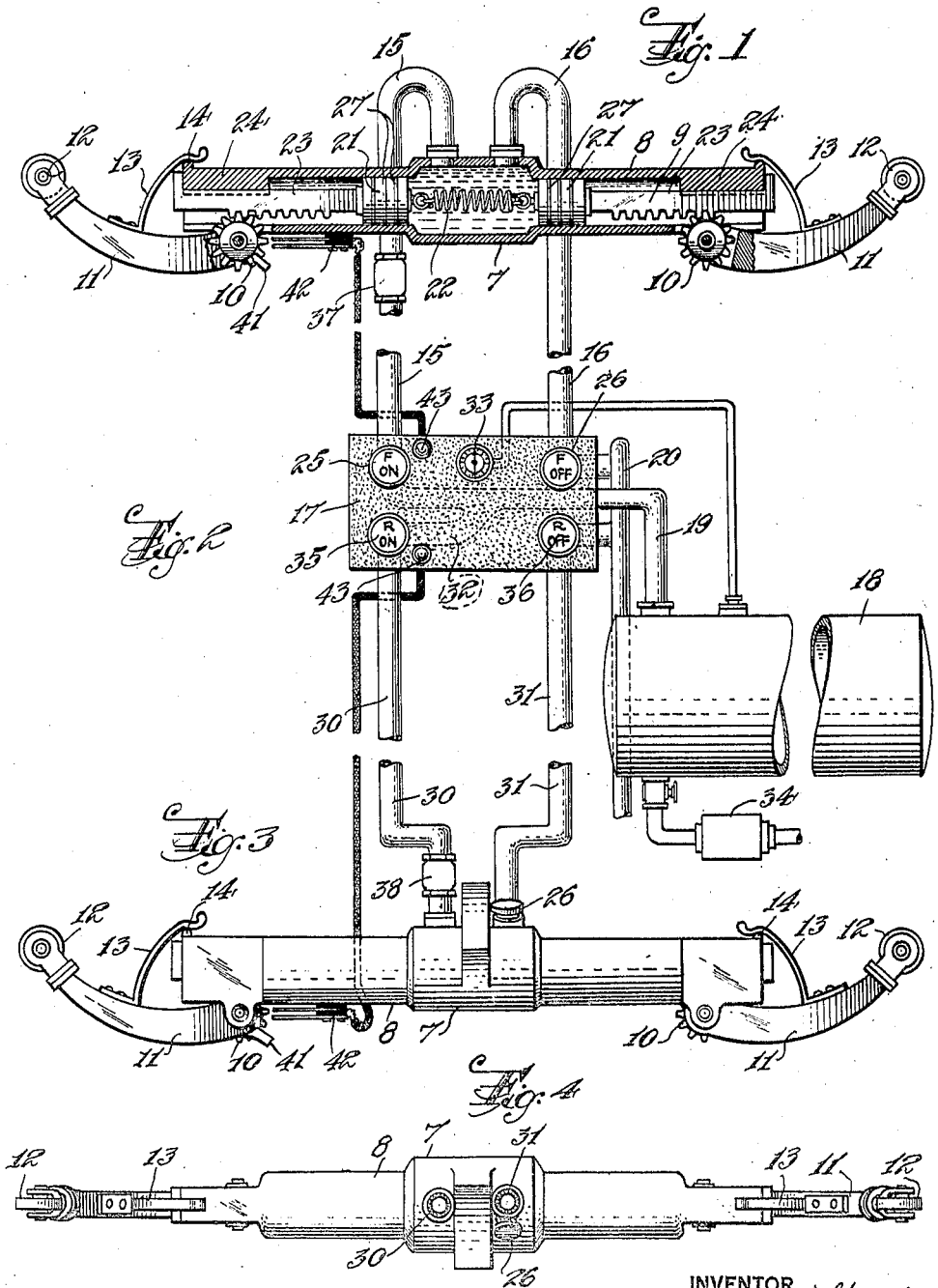
INVENTOR
Henry H. Harris
BY Max C. Fischer
ATTORNEY July 21, 1936.  H. H. HARRIS  2,048,264
AUTOMOBILE LIFTING JACK
Filed July 13, 1935    2 Sheets-Sheet 2
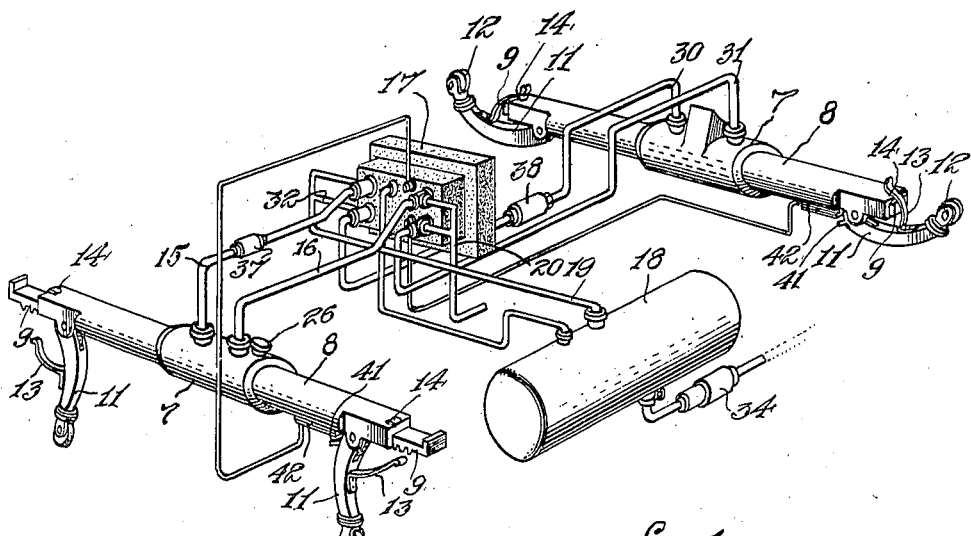
INVENTOR
Henry H. Harris
BY Frank C. Fischer
ATTORNEY Patented July 21, 1936

2,048,264

UNITED STATES PATENT OFFICE 2,048,264

AUTOMOBILE LIFTING JACK

Henry H. Harris, Newark, N. J.

Application July 13, 1935, Serial No. 31,141

4 Claims. (Cl. 254—86)

This invention relates to new and useful improvements in lifting jacks, and comprises a device which is adapted to be permanently secured to an automobile or similar vehicle, and having means conveniently controlled from the driver's seat behind the steering wheel of an automobile for raising either the front end or the rear end of an automobile.

When it is necessary to change a tire or a wheel of an automobile, the operation of raising one end of the automobile by means of a manually operated jack, is inconvenient and objectionable. In some automobiles, the axle or other parts beneath which a jack must be placed for lifting the car is so low that it is only with great difficulty that jacks of special design can be positioned properly for the purpose of lifting the automobile.

It is an object of my invention to provide a lifting jack which is operated by hydraulic means and forms a permanent part of the structure of the automobile, to enable an operator to raise the automobile at will by manipulating control devices adjacent the driver's seat.

A further object is the provision of a hydraulic lifting jack which is permanently mounted on an automobile, and embodying a rack and pinion arrangement for raising or lowering an automobile by the mere pressure of a button for controlling a supply of compressed air.

These and other advantageous objects, which will later appear, are accomplished by the simple and practical construction and arrangement of parts, hereinafter described and exhibited in the accompanying drawings, forming part hereof, and in which:

Fig. 1 is an elevational view partly in section showing essential parts of the hydraulic lifting jack, Fig. 2 is a partial plan view of a portion of the air and fluid control apparatus, Fig. 3 is an elevational view of the lifting jack, Fig. 4 is a plan view of the lifting jack shown in Fig. 3, Fig. 5 is a perspective view of my improved apparatus as mounted on an automobile, one end of the apparatus being in position to raise the automobile, and the other end of the apparatus being in inoperative position, with the wheels of the automobile resting upon the road.

Fig. 6 is a fragmentary enlarged side elevational view taken on line 6—6 of Fig. 7, and Fig. 7 is a fragmentary elevational view of a rear automobile axle having my improved device attached thereto, showing the manner in which the automobile wheels are raised clear of the road by my apparatus.

Referring to the drawings, in Fig. 5 the apparatus is shown to comprise a lifting jack at each end of an automobile. Each of the lifting jacks preferably comprises a casing 7 having integral therewith cylinders 8 through which pass racks 9 engaging pinions 10 pivotally connected to the cylinders 8 and fixed to arcuate levers 11, the latter being provided with rollers 12 at their free ends. Each of the levers 11 is provided with a suitable latch element 13, adapted to engage a lug 14 or the like projecting from the cylinder 8. Connected with the casing 7 are pipes 15 and 16, which lead to the control panel 17 which is adjacent the steering wheel and driver's seat of an automobile.

On each side of the casing 7 and movable in the cylinders 8 are pistons 21 which are attached to the racks 9. The pistons 21 are connected by a tension spring 22 which normally maintains the pistons in the position shown in Fig. 1, in which the racks 9 are completely retracted into the cylinders 8 and the levers 11 are in the raised position as shown in Fig. 1. The upper edge of the rack 9 is provided with a flange 23 which rides in a groove in an enlarged portion 24 of the cylinder 8 for the purpose of guiding and supporting the racks 9 during its operation.

The casing 7 is filled through a suitable oil cap 26 (see Fig. 4) with a viscous fluid such as oil and the fluid is prevented from leaking into the cylinders 8 by the close fit of the pistons 21 in the cylinder. The pistons may further be provided with suitable packing 27 for sealing purposes.

In operation, when it is desired to raise an end of the automobile a valve button 25 on the panel 17 which controls the valve connecting pipe 15 with the compressed air pipe 19 of the tank 18 is depressed to allow air to pass from the high pressure storage tank 18 through the pipe 19 and pipe 15 to casing 7. This air under high pressure forces the oil in casing 7 against the pistons 21 to cause the racks 9 to move outwardly from the cylinders 8 and act upon the pinions 10 to cause the levers 11 to move to a substantially vertical position as shown in Fig. 5 for the purpose of raising one end of the automobile.

The pipe 16 connected to the casing 7 is an outlet pipe for the air and is connected by a valve in the panel 17 to an exhaust pipe 20, said valve being controlled by a button 26. When the button 25 is depressed it opens the valve between pipes 19 and 15. When the button 26 is depressed, the valve between the pipes 16 and 20 is opened, allowing the air to escape from casing 7, thereby lowering the automobile. When the pressure on the pistons 21 is decreased back to atmospheric pressure, the tension spring 22 draws the pistons inwardly into the position as shown in Fig. 1, which draws the racks into the cylinders 9 and causes the levers 11 to move to raised position as shown in Fig. 1.

Compressed air is maintained in the tank 18 by means of any well known expedients such as a pump 34 which can be operated by the automobile engine until the desired pressure is attained in the tank, and said tank may be provided with an air pressure gauge 33 mounted on the panel 17.

The lifting jacks of my invention for the front and rear axles of the automobile are substantially alike and are secured to the axles in any desired or convenient manner, as by means of clamping members 28 which may be carried by the jacks and may be secured to the automobile axles (see Fig. 7).

The casing 7 of the lifting jack for the rear axle of the automobile (see Figs. 3 and 7) is preferably externally formed to snugly abut the gear housing 29 of the rear axle, and is provided with pipes 30 and 31 which correspond with pipes 15 and 16 of the front axle, for supplying compressed air from the tank 18 to the casing 7 and for discharging said air therefrom; the elbow 32 is connected with the compressed air pipe 19 and is also connected by means of a valve on the panel 17 to the pipe 30, the valve being controlled by a button 35; the pipe 31 is connected with the discharge pipe 20 by means of a valve on the panel 17, the valve being controlled by a button 36.

The levers 11 are provided with studs 41 so positioned on the levers as to engage and actuate the electrical switches 42 carried by the cylinders 8 when the levers assumed a vertical position, to light the bulb 43 on the panel 17, indicating that the jack is in its fully operative position and that no more air need be supplied to the casing.

While I have described my valve controlling means as being a button it is obvious that other means may be provided for opening and closing the valves in the panel 17 without departing from the spirit of my invention.

The buttons 25, 26, and 35, 36 on the control panel are preferably spring actuated and may be selectively depressed by the automobile operator to raise and lower the front or rear axle.

The valves controlled by the panel buttons may be of any suitable type which open only while they are manually depressed and are normally automatically closed.

If desired, the pipes 15 and 30 may be further provided with suitable check valves 37, 38 to prevent the compressed air in the casings 7 from passing back through said pipes.

The rollers 12 are preferably provided with ball bearings 39 and are preferably swivelled in the levers 11 as shown in Fig. 6. Any suitable means 40 may be provided for manually moving the rollers 12 out of the levers 11 a predetermined distance to further increase the lifting distance of the jacks.

From the above description it will be seen that I have provided a simple and effective hydraulic lifting jack which can be conveniently attached to automobiles and similar vehicles for raising the wheels for the purpose of changing the tire of the wheel. This device is highly advantageous to drivers when it is necessary for them to change a wheel or a tire as it is only necessary to press a button to raise either end of an automobile.

The foregoing disclosure is to be regarded as descriptive and illustrative only, and not as restrictive or limitative of the invention, of which certain embodiments may be constructed including many modifications without departing from the general scope herein indicated and denoted in the appended claims.

Having thus described my invention, what I claim as new and desire to secure by Letters Patent, is:

1. A hydraulic jack for vehicles, comprising a casing filled with oil, cylinders communicating with opposite sides of the casing, pistons slidably mounted in the cylinders, spring means connecting the pistons to normally hold the pistons in their innermost positions in the cylinders, racks connected to the pistons, levers having pinions enmesh with the racks, means to introduce air under pressure into the casing to force the pistons outwardly whereby the levers are caused to assume vertical positions, and means to relieve the air pressure in the casing.

2. A hydraulic jack for motor vehicles, comprising a casing filled with oil, a cylinder communicating with the casing, a piston slidably in the cylinder, spring means to normally maintain the piston in a predetermined position, a rack connected to the piston, a lever having a pinion enmesh with the rack, a tank containing air under pressure, means controlled from a position adjacent the steering wheel for introducing air from the tank into the casing to force the piston outwardly to cause the lever to assume a vertical position, means for relieving the air pressure in the casing, and latch means for holding the lever in a horizontal position when the piston is in the normal predetermined position.

3. In a jack for vehicles, a cylinder, a rack slidably arranged in said cylinder, a lever carried by said cylinder and engaged by said rack, a switch element mounted on the cylinder and a lug on the lever engaging said switch element when the lever is in a vertical position to close an electrical circuit for a sensible signal.

4. In a hydraulic jack for vehicles, a casing filled with oil, cylinders communicating with opposite sides of the casing, pistons slidably mounted in the cylinders, spring means connecting the pistons to hold the pistons in their innermost positions in the cylinders, racks connected to the pistons, levers having pinions in mesh with the racks, and means to force the pistons outwardly to cause the levers to assume vertical positions.

HENRY H. HARRIS.